United States Patent [19]

Woycheshin et al.

[11] 3,878,166
[45] Apr. 15, 1975

[54] FLAME RETARDANT POLYMERIC COMPOSITIONS

[75] Inventors: Elias A. Woycheshin, Livermore; Ronald J. Rigge, Pleasanton; Igor Sobolev, Orinda, all of Calif.

[73] Assignee: Kaiser Aluminum & Chemical Corporation, Oakland, Calif.

[22] Filed: Feb. 11, 1974

[21] Appl. No.: 441,486

[52] U.S. Cl. ....... 260/45.9 R; 260/42.46; 260/42.52; 260/45.9 R
[51] Int. Cl. ........................................... C08f 45/60
[58] Field of Search ......... 260/45.9 R, 42.46, 42.52

[56] References Cited
UNITED STATES PATENTS

| | | | |
|---|---|---|---|
| 2,783,124 | 2/1957 | Grote | 424/156 |
| 3,557,025 | 1/1971 | Emerson et al. | 423/419 |

*Primary Examiner*—Melvyn I. Marquis
*Attorney, Agent, or Firm*—Paul E. Calrow; Andrew E. Barlay

[57] ABSTRACT

Ammonium dawsonite, $[NH_4Al(OH)_2CO_3]$, significantly reduces the burning rate of polymers, such as polystyrene, polypropylene and polyethylene, when it is incorporated in the polymer in an amount equal to about 15–50 percent by weight of the filled polymer.

8 Claims, 1 Drawing Figure

FLAME-RETARDANT POLYMERIC COMPOSITIONS

× Polypropylene
○ Polystyrene
△ Poly(Methyl Methacrylate)

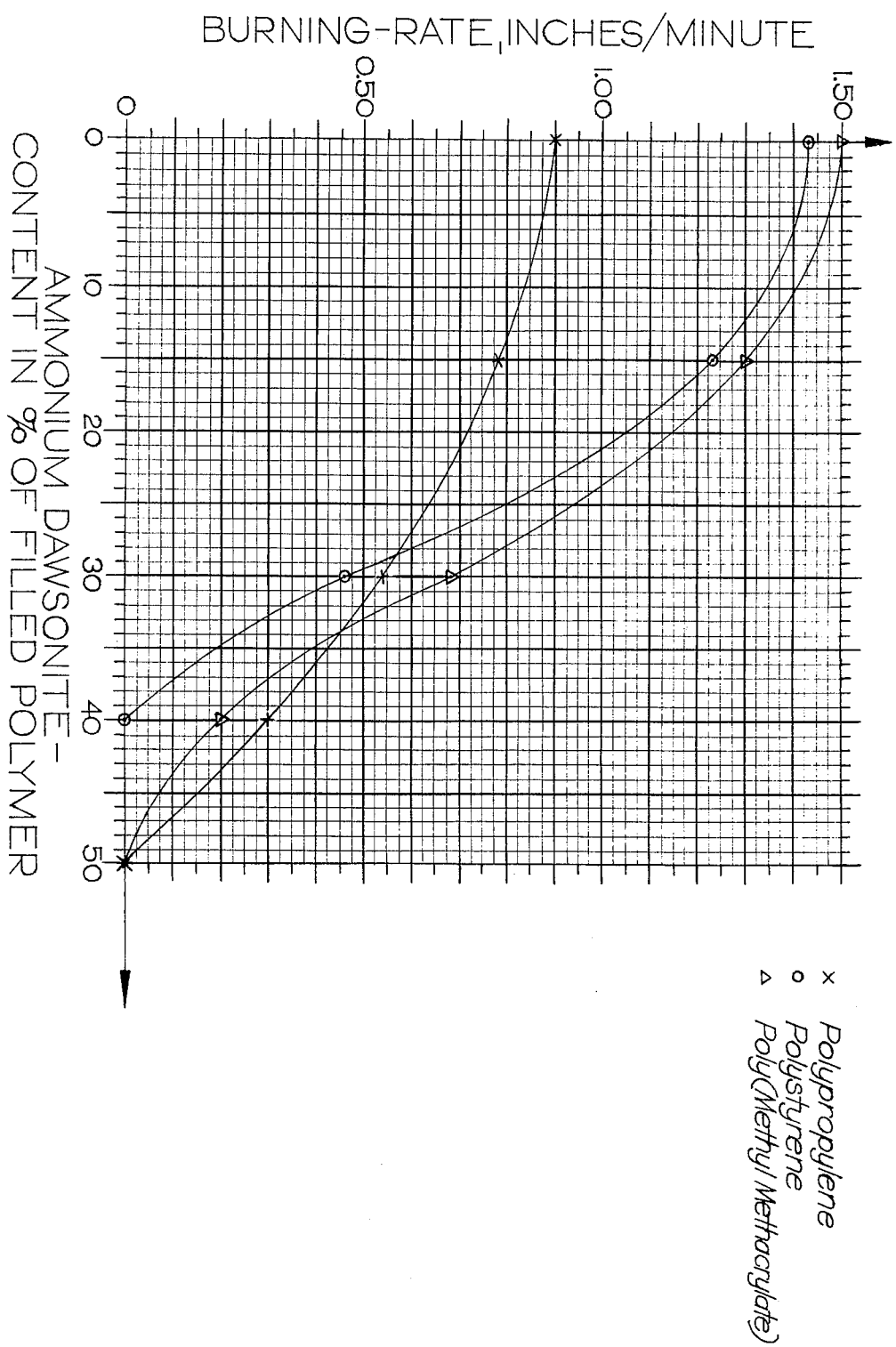

FLAME RETARDANT POLYMERIC COMPOSITIONS

BACKGROUND OF THE INVENTION

The widespread use of polymers in construction, appliances, household goods and toys, imposes the requirement of flame retardancy. Due to increasing concern in the area of flame retardancy several compounds have been developed which when added to the polymers cause at least a reduction in flammability and thus provide increased safety for the use of these polymers. Most of the flame retarding compositions added to polymers are halogenated or phosphorous-containing organic compounds alone or in combination with metal compounds, such as antimony oxide, and these compounds during pyrolysis of the polymers retard the flame spread, reduce the burning rate and thus decrease flammability. Alumina hydrate has also been employed as a flame retardant for polymers, since at temperatures from about 200°C to about 300°C, heat generated by burning of the polymer will be absorbed by the alumina hydrate and this heat will cause endothermic decomposition of the hydrate to water vapor and alumina. Due to this thermal energy transfer to the alumina hydrate the burning of the polymer by a separate ignition source will be reduced in most instances to flameless charring, consequently providing an effective barrier for combustion by preventing mixing of air with combustible gases. Alumina hydrate has been found to be a superior and economical flame retardant for most polymers due to its gradual thermal decomposition which starts at about 200°C and which is completed at 300°C–500°C, depending on heating rate. Its use for polymers having pyrolysis temperatures at or below about 450°C and rapid rates of combustion, however, is somewhat limited. The reason for this limitation is that in burning some polymers such as polystyrene (pyrolysis temperature range 299°C–350°C) pyrolyze at a temperature that is lower than the decomposition temperature of alumina hydrate. Thus, the rate of pyrolysis to volatile products (which then burn in the gas phase) is faster than the rate of dehydration, and there is insufficient time for the hydrate to absorb heat from the combustion zone to retard pyrolysis. For polymers with such relatively low pyrolysis temperatures a flame retardant filler is preferred which thermally decomposes at a lower temperature and over a narrower temperature range than alumina hydrate. Such a flame retardant filler should be capable of absorbing heat and also decomposing at temperatures below about 250°C to be able to provide the desired and effective barrier to combustion. In addition, such a filler must also be compatible with the polymers, it should not reduce excessively the physical and mechanical properties of the polymers and in addition its use should also be economical.

It has now been found that ammonium dawsonite fulfills these requirements, since its decomposition temperature falls within a narrow range, and even small quantities, for example about 15 percent by weight of the filled polymer can provide significantly reducing burning rates for polymers having relatively low pyrolysis temperatures.

THE FIGURE

The FIGURE graphically shows the relationship between the ammonium dawsonite content of filled polymers and the burning rate in inch/minute of the filled polymers at different ammonium dawsonite concentrations.

SUMMARY OF THE INVENTION

A polymeric composition having a significantly reduced burning rate comprising a polymer characterized by a burning rate within the range from about 0.7 inch/minute to about 2.5 inches/minute, a thermal degradation temperature at or below about 450°C, a processing temperature below about 200°C; in combination with ammonium dawsonite, the ammonium dawsonite being present in the composition in an amount from about 15 to about 50 percent based on the weight of the polymeric composition. The ammonium dawsonite, $[NH_4Al(OH)_2CO_3]$, imparts flame retardancy, decreased smoke density and an increased oxygen index to polymers such as polypropylene, polystyrene and poly(methylmethacrylate). In the range of about 40–50 percent ammonium dawsonite self-extinguishing properties, as measured by the UL 94 horizontal test method, can be commonly obtained for polymers characterized as above.

DETAILED DESCRIPTION OF THE INVENTION

This invention concerns a novel flame-retardant filler for polymers and more specifically, it relates to the incorporation of ammonium dawsonite $[NH_4Al(OH)_2CO_3]$ in polymers to obtain significantly reduced burning rates for the polymers.

For the purposes of this invention, the expression "ammonium dawsonite" refers to an aluminous composition containing at least about 50 percent by weight of ammonium dawsonite defined by the general formula $[NH_4Al(OH)_2CO_3]$. In addition to ammonium dawsonite, the composition may contain quantities of the aluminous starting material, for example $Al_2O_3 \cdot xH_2O$, where the value of $x$ can vary from 0 to 3, the $Al_2O_3 \cdot 3H_2O$ being fully hydrated alumina.

Preparation of ammonium dawsonite can proceed in any desirable manner. For example, as shown in U.S. Pat. No. 2,783,124 (I. W. Grote), reaction of $NH_4HCO_3$ with $Al_2O_3 \cdot xH_2O$ dispersed in an aqueous medium at a pH of at least about 7, results in the formation of $NH_4Al(OH)_2CO_3$ in good yield. U.S. Pat. No. 3,557,025 (R. B. Emerson et al.) describes the preparation of ammonium dawsonite from a selectively calcined alumina. This process involves a reaction between $NH_4HCO_3$ and a transitional $Al_2O_3$ at a mole ratio of 0.5–2.5 moles of $NH_4HCO_3$ per mole of $Al_2O_3$, at temperatures from about 100°C to about the temperature below that required to decompose the formed dawsonite.

The thermal decomposition temperature of ammonium dawsonite is within the range of about 200°C and about 250°C at a heating rate of 5°C/minute. The higher the ammonium dawsonite content of the composition the narrower the decomposition range. Thus, pure ammonium dawsonite thermally decomposes within the narrow temperature range from about 200°C to about 210°C at a heating rate of 5°C/minute; while alumina hydrate, $(Al_2O_3 \cdot 3H_2O)$, exhibits gradual thermal decomposition which although starts at about 200°C, ends at about 500°C at the same heating rate, with the majority of the water content being liberated at temperatures in excess of about 250°C.

Thermal decomposition of ammonium dawsonite proceeds according to the following equation:

$$2NH_4Al(OH)_2CO_3 \xrightarrow{\Delta} Al_2O_3 + 2CO_2 + 3H_2O + 2NH_3 \quad (1)$$

while $Al_2O_3 \cdot 3H_2O$ decomposes upon heating as follows:

$$Al_2O_3 \cdot 3H_2O \xrightarrow{\Delta} Al_2O_3 + 3H_2O \quad (2)$$

It becomes apparent from a comparison of equations (1) and (2) that ammonium dawsonite is a significantly more efficient material for flame retarding purposes since ammonium dawsonite, upon heating, releases more decomposition products than alumina hydrate per mole of flame retardant employed.

Both compounds decompose endothermically. This absorption of heat during decomposition reduces the temperature of the pyrolysis zone during burning and accounts for a significant portion of the flame-retarding effect of these compounds. Additionally, the decomposition products of ammonium dawsonite provide an increased volume of gases over those generated by the decomposition of alumina hydrate, thus creating an even more effective barrier to combustion. Further, as mentioned above, due to the lower and more narrowly defined decomposition temperature range of ammonium dawsonite its effectiveness is more pronounced particularly for those polymers which possess a relatively low thermal degradation temperature.

Ammonium dawsonite has been found to be an effective flame retardant for many polymers, particularly for those which have a low thermal degradation temperature and a rapid burning rate. For the purposes of this invention, the term "polymer" as used herein refers to organic, macromolecular compounds characterized by the following physical characteristics: (a) a horizontal burning rate within the range of about 0.7–2.5 inches/minute, as determined by the UL 94 (Underwriters Laboratories) horizontal burning test for plastics; (b) a thermal degradation temperature at or below about 450°C, (c) a processing temperature below about 200°C.

By processing temperature, that temperature is understood which is required to mold, extrude or otherwise process the polymer for making semifinished or finished products.

Typical polymers which possess the above-mentioned physical characteristics include among others the following: polyvinyl chloride, polyvinyl acetate, polyacrylonitrile, esters of polymethacrylic acid, polypropylene, polystyrene, ABS resin, polyethylene. It is to be understood, that the aforementioned listing is only partial and all polymeric materials, including copolymers, which meet the above defined physical characteristics are considered to be within the scope of the instant invention.

It has been found, that incorporation of only about 15 percent of ammonium dawsonite filler in polymers, based on the weight of the filled polymer, can cause significant reduction in the burning rate. By "significant reduction in the burning rate" a reduction of at least about 10 percent in the burning rate is understood. In other words, if for example the polymer without the ammonium dawsonite flame retardant filler, has a burning rate of 0.9 inch/minute, incorporation of about 15 percent ammonium dawsonite, based on the weight of the filled polymer, can reduce the burning rate by at least about 0.09 inch/minute to obtain a filled polymer characterized by a burning rate of less than about 0.8 inch/minute.

It has been discovered that ammonium dawsonite, in amounts up to about 50 percent by weight of the filled polymer, can not only cause significant reduction in the burning rate, but many polymers, for example polystyrene, poly(methylmethacrylate) and polypropylene, can be rendered self-extinguishing as measured by the UL 94 horizontal burning rate test. These results are entirely unexpected, since polystyrene could not be rendered flame retardant (i.e., self-extinguishing) by the incorporation of more than about 50 or even 70 percent aluminum hydrate by weight of the filled polystyrene. For polyethylene and polypropylene more than about 50 percent alumina hydrate by weight of those filled polymers was required to impart flame retardancy.

Consequently, it has been discovered, that smaller quantities of ammonium dawsonite, i.e., from about 15 to about 50 percent by weight of the filled polymer, impart significantly improved flame retardant properties to polymers in comparison to larger quantities of alumina hydrate.

Ammonium dawsonite quantities in excess of about 50 percent by weight of the filled polymer, can also be incorporated in the polymer, however, it has been found that not only processing difficulties, for example rapid increase of melt viscosity occurs, but also the flame-retarding efficiency of ammonium dawsonite will not be materially enhanced. Ammonium dawsonite quantities below about 15 percent by weight of the filled polymer do not significantly decrease the burning rate without incorporating an amount of conventional flame-retardant agent, such as antimony compounds or similar materials. In the lower ranges of ammonium dawsonite flame-retardant filler addition, for example from about 15 up to about 30 percent by weight of the filled polymer, incorporation of small quantities of conventional flame-retarding agents, whether a metal compound or a phosphorus composition, can result in further decrease in the burning rate. However, this combination in comparison to the sole addition of ammonium dawsonite, has associated with it the possibility of corrosive and harmful vapor formation during thermal degradation and increased smoke generation during burning.

Incorporation of ammonium dawsonite in polymers can be accomplished by well-known methods, for example by milling, kneading or by other conventional processing means including addition to the monomer prior to polymerization. To obtain the best flame-retarding results from the addition of ammonium dawsonite to polymers, care should be taken to achieve substantially uniform distribution of the dawsonite within the polymer. Uniform distribution not only helps further processing, but also provides the maximum flame-retarding effect at a given dawsonite concentration.

To further illustrate the novel aspects of the instant invention, the following example is provided.

EXAMPLE

Preparation of Ammonium Dawsonite
[$NH_4Al(OH)_2CO_3$]

A sodium aluminate solution having an $Al_2O_3$ concentration of about 440 grams/liter and a NaOH concentration of about 390 grams/liter was reacted with nitric acid of about 10 percent by volume concentration. The reaction temperature was kept at about 40°C and a pH of about 6-7 was maintained during the reaction by the controlled addition of the nitric acid. The precipitated hydrous alumina was then filtered and washed with water. The wet filter cake was then slurried with an aqueous, saturated $NH_4HCO_3$ solution, the slurry containing a slight excess of $NH_4HCO_3$ over the stoichiometric quantity required to convert all of the hydrous alumina to ammonium dawsonite. After stirring the slurry for 30 minutes at ambient temperature, the temperature was raised to about 80°C and the stirring was continued for an additional 30 minutes. The reaction product was then filtered, washed with several increments of deionized water and subsequently dried at about 110°C for 1 hour. The dried aluminous compound was then analyzed. The product contained 25 percent by weight $CO_2$, about 12 percent by weight $NH_3$ and it exhibited a 60.4 percent loss on ignition (LOI) as measured by heating to 1,000°C for 30 minutes. X-ray diffraction data together with differential thermal analysis results clearly established the presence of ammonium dawsonite of the formula $NH_4Al(OH)_2CO_3$ in an amount in excess of about 90 percent by weight of the product. The thermal decomposition temperature of the product was found to be in the 200°-210°C temperature range at a heating rate of 5°C/minute. Enthalpy measurements indicated that this ammonium dawsonite product absorbed 500 cal/g heat energy for decomposition (measured from 25°C to 500°C). In comparison, an alumina hydrate ($Al_2O_3.3H_2O$) of gibbsitic structure by the same measurement absorbed only 430 cal/g, about 15 percent less than the ammonium dawsonite, which also indicates the superiority of ammonium dawsonite over alumina hydrate, as a flame retardant filler for polymers.

Ammonium Dawsonite as a Flame Retardant Filler

The effectiveness of ammonium dawsonite as a flame retardant filler for polymers was tested by incorporating ammonium dawsonite in three representative polymers comprising polypropylene, polystyrene and poly(methylmethacrylate). These polymers meet the physical characteristics set forth above and their physical properties are shown in Table I.

As it can be seen from Table I, the representative polymers recited have a burning rate ranging from 0.90 to 1.50 inches/minute, a thermal degradation temperature below about 450°C and processing temperatures below about 200°C.

Polypropylene

Polypropylene test samples were prepared by incorporating in polypropylene by milling on a two-roll mill varying amounts of ammonium dawsonite made in accordance with the process described hereinabove. Ammonium dawsonite quantities of 15, 30, 40 and 50 percent (percentage based on filled polypropylene) were added to individual batches of polypropylene and after milling, test samples were prepared by compression molding at 185°C. These test samples were subjected to the UL 94 horizontal burning rate test; the results are tabulated in Table II and are also graphically shown in the FIGURE.

Polystyrene

Polystyrene test samples were also prepared by incorporating by milling in individual polystyrene batches 15, 30 and 40 percent ammonium dawsonite (percentage based on the filled polystyrene). Molded test samples were made and the samples were subjected to the same burning rate test employed for polypropylene. The results are shown in Table II and also in the FIGURE.

Poly(methylmethacrylate)

Ammonium dawsonite quantities of 15, 30 and 40 percent (percentage based on the filled poly(methylmethacrylate)) were milled in poly(methylmethacrylate) samples. The molded test samples were subjected to the aforementioned burning test method and the results are incorporated in Table II, as well as in the FIGURE.

For comparison purposes, polystyrene, polypropylene and poly(methylmethacrylate) samples were also prepared, each sample containing 40 percent commercial alumina hydrate ($Al_2O_3.3H_2O$); the percentage being based on the weight of the filled samples. These samples were made by milling and test specimens were prepared by molding. The molded samples were then tested for burning rate by the UL 94 method referred to above. The results are reported in Table II.

In addition, calcium carbonate, a conventional filler, has also been tested for polystyrene and polypropylene at a 40 percent filler level and the results are also shown in Table II.

Table I

Physical Characteristics of Unfilled Polymers

| Polymer | Burning rate[1] inch/minute | Thermal degradation temp.[2] in °C | Processing Temperature °C |
|---|---|---|---|
| Polypropylene* | 0.90 | 380°C | <200 |
| Polystyrene** | 1.43 | 360° | <200 |
| Poly(methylmethacrylate)*** | 1.50 | 330° | <200 |

[1]UL 94 Horizontal Test
[2]Thermal Degradation Temperatures are from page 58, Table VII of "The Mechanisms of Pyrolysis, Oxidation and Burning of Organic Materials" Edited by L. A. Wall, National Bureau of Standards, Special Publication Number 357, June 1972.
*"Marlex" 9400, made by Phillips Petroleum Company.
**"Lustrex" HF-77, made by Monsanto Company.
***"Plexiglas" VM-100, made by Rohm & Haas Company.

Table II

| Flame Retardant Filler | | Polymer | | |
|---|---|---|---|---|
| | | Polypropylene[1] | Polystyrene[2] | Poly(methylmethacrylate)[3] |
| Type | %* | Burning Rate** inch/minute | Burning Rate inch/minute | Burning Rate inch/minute |
| Ammonium Dawsonite $NH_4Al(OH)_2CO_3$ | 0 | 0.90 | 1.43 | 1.50 |
| | 15 | 0.78 | 1.23 | 1.30 |
| | 30 | 0.54 | 0.46 | 0.68 |
| | 40 | 0.30 | self-extinguishing | 0.20 |
| | 50 | self-extinguishing | — | self-extinguishing |
| $Al_2O_3 \cdot 3H_2O$ | 40 | 0.52 | 1.23 | 1.20 |
| $CaCO_3$ | | 0.93 | 1.19 | — |

*Percentages based on the weight of the filled polymer
**UL 94 Horizontal Burning Test Method
[1] "Marlex" 9400
[2] "Lustrex" HF-77
[3] "Plexiglas" VM-100

It becomes evident from the tabulated results shown in Table II, that incorporation of ammonium dawsonite in polymers causes a significant reduction of the burning rate and thus renders this novel flame retardant eminently suitable for a large class of polymers. In addition to its excellent flame retarding properties, ammonium dawsonite also reduces the smoke density of the filled polymer under burning or charring conditions and increases the oxygen index of the polymer, which further indicates that during burning or charring of the filled polymer, ammonium dawsonite thermal decomposition products provide an effective barrier to continued oxidative thermal degradation of the polymer. Table III indicates the reduction in smoke density ratings and the increases in oxygen index imparted by the addition of ammonium dawsonite to polymers.

TABLE III

| Filler | | Polymer | | | |
|---|---|---|---|---|---|
| | | Polypropylene | | Polystyrene | |
| Type | %[1] | Smoke[2] Density Rating % | Oxygen Index (3) | Smoke Density Rating % | Oxygen Index |
| Ammonium Dawsonite | 40 | 1 | 23.5 | 36 | 23.7 |
| $Al_2O_3 \cdot 3H_2O$ | 40 | 6 | 22.5 | 78 | 20.2 |
| $CaCO_3$ | 40 | 5 | 19.0 | 80 | 19.6 |
| None | 0 | 15 | 17.4 | 87 | 17.9 |

[1] Percentage based on filled polymer
[2] ASTM D2843
[3] ASTM D2863

While the invention has been illustrated in relation to certain specific embodiments of it, various obvious modifications can be made within the scope of the appended claims which are intended also to embrace equivalents of the specific embodiments.

What is claimed is:

1. A polymeric compound of significantly reduced burning rate, as measured by the Underwriters' Laboratories (UL) 94 Horizontal Burning Rate Test, comprising a polymer selected from the group consisting essentially of polyvinyl chloride, polyvinyl acetate, polyacrylonitrile, esters of polymethacrylic acid, polypropylene, polystyrene, ABS resin and polyethylene, and characterized by a burning rate in the range from about 0.7 inch/minute to about 2.5 inches/minute, a thermal degradation temperature at or below about 450°C, a processing temperature below about 200°C; and an ammonium dawsonite composition containing at least about 50 percent by weight ammonium dawsonite of the formula $NH_4Al(OH)_2CO_3$, the balance consisting of aluminous starting material, the ammonium dawsonite composition being uniformly distributed in the polymeric compound in an amount from about 15 to about 50 percent by weight of the polymeric compound.

2. A polymeric compound of claim 1, wherein the polymer is polystyrene.

3. A polymeric compound of claim 1, wherein the polymer is polypropylene.

4. A polymeric compound of claim 1, wherein the polymer is poly(methylmethacrylate).

5. A process for significantly reducing the burning rate of polymeric compounds, which comprises admixing a polymer selected from the group consisting essentially of polyvinyl chloride, polyvinyl acetate, polyacrylonitrile, esters of polymethacrylicacid, polypropylene, polystyrene, ABS resin and polyethylene, characterized by a burning rate in the range from about 0.7 inch/minute to about 2.5 inches/minute as measured by the Underwriters' Laboratories (UL) 94 Horizontal Burning Rate Test, a thermal degradation temperature at or below about 450°C, a processing temperature below about 200°C; with an ammonium dawsonite composition containing at least about 50 percent by weight of ammonium dawsonite of the formula $NH_4Al(OH)_2CO_3$, the balance consisting of aluminous starting material, uniformly distributing within the polymeric compound the ammonium dawsonite composition; and recovering a polymeric compound containing from about 15 to about 50 percent ammonium dawsonite composition by weight of the polymeric compound.

6. Process according to claim 5, wherein the polymer is polystyrene.

7. Process according to claim 5, wherein the polymer is polypropylene.

8. Process according to claim 5, wherein the polymer is poly(methylmethacrylate).

* * * * *